Figure 4:
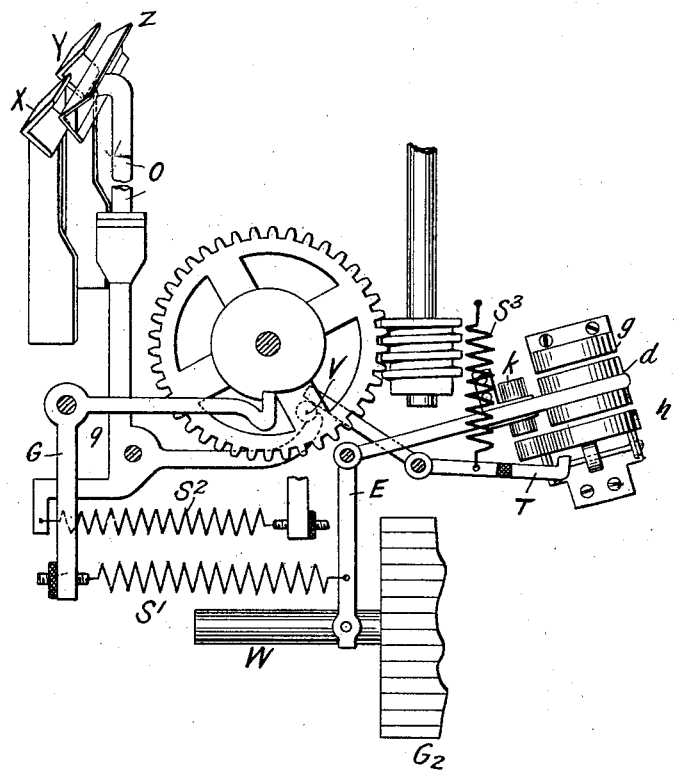

No. 720,607. PATENTED FEB. 17, 1903.
J. F. McELROY.
ELECTRIC LIGHTING SYSTEM.
APPLICATION FILED OCT. 26, 1901.
NO MODEL. 3 SHEETS—SHEET 1.
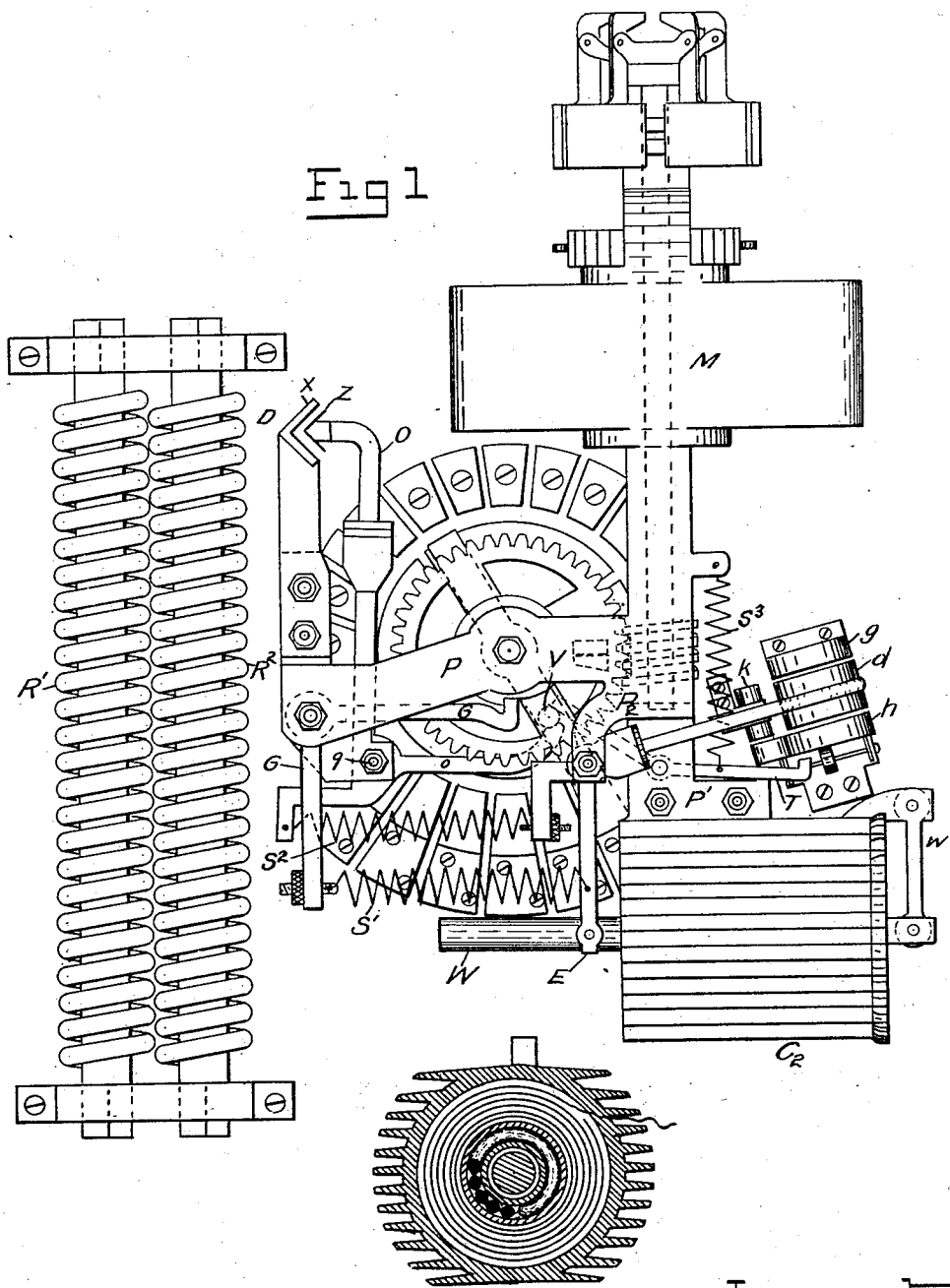
Witnesses
L. T. Shaw
A. M. Dewhurst
Inventor
James F. McElroy
by E. M. Bentley
Atty

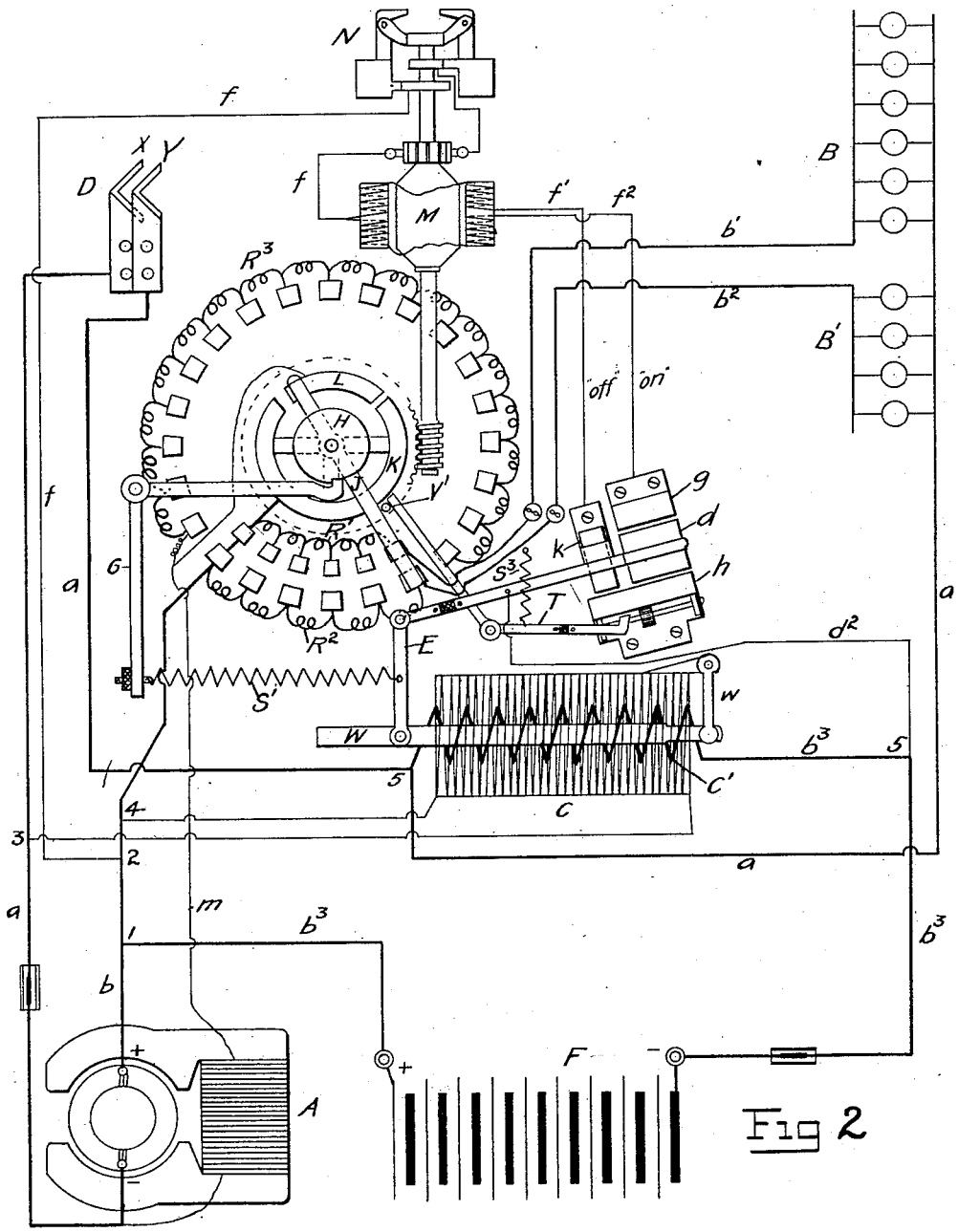

No. 720,607. PATENTED FEB. 17, 1903.
J. F. McELROY.
ELECTRIC LIGHTING SYSTEM.
APPLICATION FILED OCT. 26, 1901.
NO MODEL. 3 SHEETS—SHEET 3.

UNITED STATES PATENT OFFICE.

JAMES F. McELROY, OF ALBANY, NEW YORK.

ELECTRIC-LIGHTING SYSTEM.

SPECIFICATION forming part of Letters Patent No. 720,607, dated February 17, 1903.

Application filed October 26, 1901. Serial No. 80,048. (No model.)

*To all whom it may concern:*

Be it known that I, JAMES F. MCELROY, a citizen of the United States, residing at Albany, county of Albany, and State of New York, have invented certain new and useful Improvements in Electric-Lighting Systems, of which the following is a specification, reference being made to the accompanying drawings, wherein—

Figure 1 is a front elevation of the mechanism embodied in my invention. Fig. 2 is a diagram of the circuit connections thereof. Fig. 3 is a detailed illustration of the controlling-magnet employed by me. Fig. 4 shows the several levers operated by the regulator.

In a system of electric lighting heretofore devised by me for use with a variable-speed generator driven, for example, by the axle of a railway-car I have provided certain features of construction for connecting the dynamo to the main line when its potential reaches a predetermined point and disconnecting it when the potential falls below that point. I have also provided means for regulating the generator to maintain a constant line-potential and have provided other features, all of which have required the use of a plurality of electromagnets, principally shunt-magnets wound with fine wire, acting, respectively, to set in motion certain apparatus in response to changes in the potential of the circuit to which the coil is connected.

My present invention comprises an improvement upon the system above referred to and involves principally the use of a single electromagnet of the aforesaid type for accomplishing results previously secured only by a multiplicity of such magnets, which are of an expensive type. There are also other features of the invention, which will be referred to hereinafter and described in the claims.

More specifically, I employ as one of the ways in which the aforesaid invention may be embodied the particular arrangement illustrated in the drawings, wherein—

A represents a dynamo-electric machine, which is understood to be driven at a variable rate of speed—as, for example, by the axle of a railway-vehicle.

B and B' represent groups of lamps on the vehicle operated from the generator A.

F represents a storage battery designed to be charged by the generator A and to be discharged into lamps B and B' whenever they are not operated from the dynamo itself. The generator when the train is standing still and when running below a certain speed is disconnected from the main circuit by the switch D, and heretofore I have used a potential-magnet in the circuit of the generator which would act to close this main switch whenever the potential of the machine reached a specified point. In my present invention, however, this switch is closed by the action of the regulating-magnet in a way to be hereinafter described. Assuming, however, that the switch D is closed automatically and the potential of the generator has attained the proper value, then the machine will be connected to the main circuit, from which both the battery C and the lamps B and B' are supplied, the battery and lamps being both supplied directly from the line at the normal lamp-pressure; but as the speed of the train increases the standard pressure of the generator is adjusted gradually to a higher point with a simultaneous introduction of resistance into the lamp-circuit, so that the lamps will still receive their normal pressure, but the batteries will be subjected to the gradually-increasing pressure of the dynamo. When a certain difference is established between the pressure supplied to the batteries and that supplied to the lamps, then the adjustment of the dynamo-potential ceases, and it is thereafter maintained constant at the increased value. In this manner the dynamo when it comes into action is connected to the lamps, which are supposed to be supplied from the battery in the meanwhile at the normal lamp-pressure, which is also the pressure maintained by the batteries while discharging. This introduces the dynamo-current without causing any fluctuations in the lamps; but since the batteries require to be charged at a slightly-higher potential in order that they may discharge at the normal potential the aforesaid adjustment of the standard dynamo-pressure is made.

The closing of the switch D and the regulation and adjustment above mentioned, together with other functions, are secured through a single electromagnet of the solenoid type and certain mechanism controlled thereby, which will be now described. C is a solenoid-magnet comprising a shunt-coil of fine wire connected in circuit across the mains $ab$ by a branch leading from the said mains at points 3 and 4. This coil is energized by the dynamo driven by the car-axle, and when the dynamo speed reaches a certain point its potential is sufficient to energize the coil C and cause it to attract its core W against the force of the spring S'. The core W of the magnet C is supported at one end by the link $w$ and at the other end by the angle-lever E, which the core operates. The solenoid-magnet C is surrounded by an iron casing $C^2$, preferably formed with heat-radiating devices, such as longitudinal ribs or flanges, which serve to dissipate the heat produced in the shunt-coil by the current flowing therein, the said coil being constantly on duty. Without such provision for dissipating the heat the resistance of the coil will rise in the course of time, and a potential greater than that contemplated will be required to set the solenoid in action and give it its proper function. As a consequence there will be a gradual rise in the potential applied to the lamps and battery as well as in the potential at which the dynamo will be connected to and disconnected from the line. This will bring a strain on the lamps and increase their brilliancy over that at which they start and at which they are calculated to burn with safety. The magnet is supported on a bracket P', extending from the frame P, upon which the entire mechanism is supported. The lever E is pivoted in another bracket or projection $P^2$ from the same frame.

As shown in Figs. 1 and 2, the lever E carries at the extremity of its upper arm a carbon contact-block $d$, which is connected to one side of the circuit by a wire $d^2$, leading from point 5, connected to one terminal wire $b^3$ of the battery F to the insulated extremity of lever E, upon which the block $d$ is carried. The block $d$ plays or vibrates between two other blocks of carbon $g$ and $h$, connected, respectively, (the latter through a third block $k$,) to the two wires $f'$ and $f^2$, so as to connect one or the other of the said wires to the wire $d^2$ aforesaid. The two wires $f'$ and $f^2$ pass in opposite directions around the field-magnet of a motor M and then unite in a wire $f$, which passes through the armature of the motor M, then through the centrifugal circuit-breaker N, whence it passes to the point 2 on the line-wire $b$, which is connected to the opposite terminal of the storage battery F. It is thus evident that the solenoid-magnet C will act when attracting its core to close the circuit of the motor M by operating the lever E to bring the block $d$ into contact with block $g$, and the motor will then run in a direction determined by the field-magnet coil in the circuit of the wire $f^2$. On the other hand, when the magnet C releases its core and the block $d$ is thereby allowed to drop and make contact with the block $h$ the motor M will also be energized, but will run in the opposite direction under the influence of field-magnet coil in the circuit $f'$, (assuming that the block $h$ is in contact with the block $k$, which forms the terminal of the wire $f'$.)

The motor M drives by means of a worm-gear the contact-arm J of a circular rheostat comprising the resistances R', $R^2$, and $R^3$. The arm J, starting from the neutral position shown in Fig. 2, passes first over the two parallel rheostats R' and $R^2$ and then passes off onto the rheostat $R^3$, over which it travels during the remainder of its circular movement. The former two rheostats are thereby included, respectively, in series with the lamp groups B and B', and the latter rheostat is thereby included in the field-magnet circuit of the dynamo A, which is of the shunt type.

The circuits are as follows: From the positive terminal of the dynamo proceeds the main line-wire $b$, which is connected to the sector K, upon which the arm J bears, and the current from K passes by the arm J to the two branch wires $b'$ and $b^2$, which supply the respective lamp groups B and B' and include more or less of the rheostats R' and $R^2$, respectively, as may be determined by the position of the arm J, which in its neutral situation (shown in Fig. 2) completely short-circuits the said resistances, but as it moves to the left introduces them section by section into their respective lines $b'$ and $b^2$. The lamps aforesaid are connected on the other side to the return-wire $a$, leading to the opposite terminal of the dynamo A and containing the main switch D. A branch circuit for the storage battery starts from the main wire $b$ at the point 1 and passes by the wire $b^3$ through the battery F and then through the coarse-wire-adjusting coil C', which is wound parallel with the shunt-coil C, and then is connected to the opposite side of the circuit—namely, the wire $a$—at the point 5. The battery is thus in multiple with the lamps, and both will be supplied from the dynamo A.

The purpose of the adjusting-coil C' is to modify or adjust the action of the shunt-coil C in accordance with the condition of the storage battery F. When a battery is completely discharged, or nearly so, it is important that the charging-current should result from a lower electromotive force than is required after the battery has become partly charged, so as to have a counter electromotive force of its own. Since it is the function of the magnet C to determine the potential of the system, it will respond to a lower potential when it is assisted by a current in the coil C'. Therefore when the charging of the battery begins and a heavy current tends to flow through it and also through the coil D' in series therewith a somewhat lower potential will be maintained upon the system by the adjusting action of coil C' upon regulating-magnet C. In this manner the standard potential of the system is adjusted to meet the requirements of the storage battery. Of course this will not be carried to such an extent as to materially affect the operation of the lamps, and when the battery is partly or wholly charged little or no current will pass through the coil C' and its effect will be negligible. It is only intended to be effective during the comparatively short period when the battery is being first charged or has become considerably run down. Ordinarily the charge in the battery will be maintained, so that the few turns comprised in the coil C' will not have any pronounced effect upon the magnet C. I am thus enabled to charge the battery in accordance with the specifications of the battery-manufacturer, whose guarantee depends upon a proper usage of the battery, including the avoidance of an abnormal current at the beginning of the charge, such as would result from impressing a high charging-potential upon it when its own counter-potential is small or non-existent.

Referring next to the main switch D, which I have heretofore operated by a special magnet, it will be seen in Fig. 1 that it is controlled by a lever O, pivoted at the point 9 in a bracket carried by the main frame P. The switch D has two stationary contacts X and Y, as appears in Fig. 2 and also in Fig. 4, which are connected together by a movable contact Z, carried on the end of lever O. The lever O is moved in one direction by the spring $S^2$ and in the other direction by a pin V (shown in dotted lines in Fig. 1) upon the rheostat-arm J, which engages an arm $o$, projecting horizontally from the lever O. In the neutral situation shown in the drawings this main switch D is open by reason of the engagement of the pin V with the arm $o$; but when the motor M is started into action the pin V immediately releases the lever O, and the spring $S^2$ then throws the said lever so as to close the main switch by bringing the contact Z against the two stationary contacts X and Y.

The closure of the main circuit and the starting of the dynamo into action are thus determined by the actual potential attained by the dynamo and not upon its speed alone. The circuit which is thus closed is maintained closed until, in a manner to be hereinafter described, the regulating-rheostat comes back to its neutral position, as shown in the drawings. The regulating-magnet C has thus served at the outset to close the main circuit, and thereafter the vibrations of its core will not again open the main circuit until the speed of the machine and its potential have fallen definitely to a point below the normal one at which the generator is put into action.

The spring S', which serves as the retractile spring for the core of the magnet C, is attached at its right-hand end to the lever E and at its left-hand end is attached to one arm of the angle-lever G, pivoted in the frame P. The other arm of the lever G bears upon a cam H, connected to the rheostat-arm J and so shaped that while the arm J is traveling over the resistances R' and $R^2$ the lever G will be gradually turned by the cam, so that its lower arm moving slightly to the left will increase the tension upon the spring S'. This increase of tension upon the spring ceases when the contact-arm J passes off from the rheostat R' $R^2$ and comes on the rheostat $R^3$. Again, there is a pin V', which turns with the rheostat-arm J and comes against the left-hand end of the lever T, whose opposite end normally lifts up the carbon block $h$ under the tension of the spring $S^3$ against the contact-point $k$ in the circuit of the wire $f'$. When the rheostat comes back to its off or neutral position, the pin V' forces down the right-hand end of the lever T against the force of the spring $S^3$ and allows the block $h$ to drop and break contact with the block $k$, thereby opening the circuit of the motor M through the field-magnet wire $f'$. As I have already indicated, the circuit of the motor M is closed by the contact-block $d$ coming into contact either with a block $g$ or with the block $h$, in the former case starting the motor into action in the direction to turn the rheostat-arm J on and in the latter case in a direction to turn it off from the rheostat-contacts, as indicated by the words "On" and "Off" in Fig. 2. Remembering that the motor M is in the battery-circuit—that is, is connected on the battery side of the main switch D—there is no possibility of the main switch D being opened by accident, so as to prevent the rheostat coming to its off position. This has the further value of insuring a positive opening of the switch D by the motor. The opening of the switch has in other arrangements been more or less uncertain by reason of the sticking of the contacts and a consequent failure of the switch to open when the speed drops; but by applying the motor to the switch it is sure to open, particularly as the motor is supplied from the battery, which continues to give out current after the dynamo slows down and stops, the motor being also governed by a magnet which measures the dynamo-potential. The battery will continue to run the motor, even if the switch D were opened or the circuit otherwise broken or the field-magnet of the dynamo interrupted or other accident occurs. When, however, the rheostat comes to its off or neutral position, it throws the lever T, thereby opening the motor-circuit and allowing the control of that circuit to revert to the regulating-magnet C. It will be noted that the spring $S^3$ is stronger than the spring S', as indicated in Fig. 4, so that points $k$ and $h$ cannot be separated by the normal action of the spring S'. It will be evident that the first movement of this arm J introduces the resistances R' and $R^2$ step by step into series with the lamp groups B and B', while at the same time there is no resistance in the circuit of the dynamo field-magnet, that circuit passing by the wire $m$ to the sector L, upon which the arm J bears. When, however, the arm passes onto the first section of the resistance $R^3$, the field-magnet circuit passes by the wire $m$ to the arm J via the first contact of rheostat $R^3$ and thence by the sector K to the opposite line-wire $b$.

Assuming, for example, that the lamp-pressure is sixty volts, the magnet C will become energized as the dynamo begins to speed up when that potential is reached under the full field-magnet strength of the dynamo, the field-magnet circuit containing no resistance. This will start the motor M and the rheostat in the manner aforesaid and close the switch D. Assuming that the lamps have previously been supplied from the battery F at sixty volts, it is evident that the dynamo-current will reach the lamps at exactly the same voltage as that of the battery. It will be "insinuated," so to speak, into the lamps, since both dynamo and battery are at the same pressure. As the dynamo gains in speed, however, and the motor M continues to run, a section of the resistances $R'$ and $R^2$ is introduced into the respective lamp-circuits, while the regulator-magnet is adjusted by the tension of its spring $S'$ so as to respond to sixty-two volts. This increased voltage will be impressed by the dynamo upon the battery F and the charging of the battery will begin. Both lamps and battery are thus fed by the dynamo, the latter at sixty-two volts and the former at the normal voltage of sixty, the difference being due to the presence of the resistances in the lamp-circuits. In the same manner the line-voltage will be increased step by step until it reaches, say, seventy volts, which will be the pressure required for charging the battery, while the pressure upon the lamps remains at sixty. The adjustment will then cease, it being noted that this action is merely an adjustment of the standard constancy and takes place with each increase in the speed of the dynamo. If the dynamo does not change its speed, but runs at a constant speed somewhere between sixty and seventy volts, the voltage will be maintained constant at the intermediate point. In other words, the system remains a constant-potential system, but the standard of constancy is raised step by step. When the limit of adjustment has been reached, any further increase in speed of the dynamo causes the regulating-magnet to maintain the on circuit of the motor M, so that the rheostat-arm J continues to rotate, and thereby introduce the resistance $R^3$ into the field-magnet circuit of the dynamo, which will prevent its pressure rising above the fixed voltage of seventy, no matter how the speed may rise. In practice it has been found necessary to provide for the contingency of a rise in speed of the car to eighty or one hundred miles per hour, which indicates the great range of regulation which must be provided for and the practical difficulties which must be overcome in securing a constant pressure at the lamps at all times, whether the train be standing still or whether it be running at the extreme speed above mentioned. In practice the apparatus above described gives a mechanism of extreme simplicity all mounted upon the common frame P, which carries also the motor M. The entire mechanism is only twice the actual size of the representation thereof in the drawings and may readily be contained in a small box located at any convenient point on a railway-car. As the speed of the train decreases the reverse action to those already explained takes place, and I have found that the rheostat-arm follows almost exactly the speed changes of the train, coming back to the off position at the exact point of train speed—say twenty miles per hour—at which it is designed to have the work of the dynamo begin. The centrifugal governor N opens the circuit of the motor M when a certain motor speed is exceeded, which prevents the racing of the motor and the pumping or vibration of the rheostat, which would otherwise occur and cause fluctuations in the lamps. The rheostat-arm follows steadily and accurately the speed variations of the train—neither running ahead nor lagging behind.

Many of the features above described have been already included in other applications for patents, and it is to be understood that the present application relates principally to the improvement residing in the suppression of the various costly and complicated potential magnets heretofore employed and the use of but one magnet to accomplish the functions and results which have heretofore required a multiplicity of magnets.

The invention to which the present application relates is pointed out in the following claims:

1. In an electric-lighting system the combination with a variable-speed dynamo of the constant-potential type, of a regulator therefor, a switch for closing the main circuit, and a potential-magnet included in the circuit between the terminals of the dynamo and operating both the said switch and the said regulator.

2. In an electric-lighting system the combination with a variable-speed dynamo of the constant-potential type, of a regulator therefor, a switch for closing the main circuit, a potential-magnet included in circuit between the dynamo-terminals, and mechanism for operating both the regulator and the switch in succession controlled by the said magnet.

3. In an electric-lighting system the combination with a variable-speed dynamo of the constant-potential type, having its field-magnet contained in a shunt-circuit between the dynamo-terminals, of a rheostat in said field-magnet circuit, a switch for connecting the dynamo to the main circuit, mechanism for closing the said switch and introducing the said rheostat successively, and a potential-magnet connected in circuit between the motor-terminals and controlling the said mechanism.

4. In an electric-lighting system the combination with a variable-speed dynamo of the constant-potential type, of a switch for connecting it to the circuit, a regulating-rheostat for the dynamo, a motor controlling both the said rheostat and the said switch, and a potential-magnet included in circuit between the dynamo-terminals controlling the said motor.

5. In an electric-lighting system the combination with a variable-speed dynamo of the constant-potential type, of a switch for connecting it to the circuit, a regulating-rheostat for the dynamo, a motor controlling both the rheostat and the switch, a reverser for the motor, and a potential-magnet included in circuit between the motor-terminals for operating the said reverser.

6. In an electric-lighting system the combination with a variable-speed dynamo, of a switch for connecting it to the circuit, a regulator for the dynamo, a motor for the regulator serving also to close the aforesaid switch at starting, and open it when brought to the neutral point, and a potential-magnet for starting the motor and controlling the subsequent progress of its regulating action included in circuit between the dynamo-terminals.

7. In an electric-lighting system the combination with a variable-speed dynamo of the constant-potential type, of a regulator therefor, a main switch operated by the said regulator in departing from, or coming into its neutral or off position, a potential-magnet connected in circuit between the dynamo-terminals and serving to start the regulator when the dynamo reaches a given potential, and connecting devices between said magnet, and regulator for restricting an increase in the line-potential upon a further increase in the speed of the dynamo.

8. In an electric-lighting system the combination with a variable-speed dynamo, of a switch for connecting it to the circuit, a regulating-rheostat, a motor for the rheostat, serving also to close the said switch when starting the rheostat, a circuit-closer in the motor-circuit comprising a contact vibrating between two reversely-connected contacts, and a potential-magnet connected in circuit between the dynamo-terminals and operating the said vibrating contact.

9. In an electric-lighting system the combination with a variable-speed dynamo, of a circuit containing electric lamps and a storage battery, a switch for connecting the dynamo to the said circuit, a regulator for the dynamo, a motor controlling both the said regulator and the said switch, and connected in circuit between the terminals of the said battery, and a potential-magnet controlling the said motor.

10. In an electric-lighting system the combination with a variable-speed dynamo, of a switch for connecting it to the main line, a rheostat between the dynamo and electric lamps to be operated thereby, a rheostat in the field-magnet circuit of the dynamo, mechanism for first closing the said switch and then operating the said rheostats in succession, and a potential-magnet controlling the said mechanism and located in a circuit between the dynamo-terminals.

11. In an electric-lighting system the combination with a dynamo, of a regulating-magnet therefor connected in the circuit from the dynamo, and provided with a metallic radiator for dissipating the heat generated therein.

12. The combination with an electromagnet of the solenoid type, of a movable core therein, and an external shell of magnetic material separated from the said core and provided with heat-radiating ribs, or extensions.

13. In an electric-lighting system the combination with a variable-speed dynamo of a regulator therefor, a potential-magnet contained in a circuit between the dynamo-terminals, and controlling connections between the said magnet and regulator, the said magnet being provided with radiating ribs, or projections for dissipating the heat generated therein.

14. In an electric-lighting system the combination with a variable-speed dynamo of the constant-potential type, having its field-magnet circuit contained in a shunt from the dynamo-terminals, of a regulating-rheostat in the field-magnet circuit, and a potential-magnet governing the said rheostat and provided with heat-dissipating devices.

15. In an electric-lighting system, the combination with a variable-speed dynamo of electric lamps and a storage battery, a connection-switch for disconnecting the dynamo from the line at a predetermined speed, a motor for operating said switch deriving its current from the battery and a magnet measuring the dynamo-pressure and controlling the said motor.

16. In an electric-lighting system, the combination with a variable-speed dynamo of electric lamps and a storage battery, a connection-switch for disconnecting the dynamo from the line at a predetermined speed, a motor for operating the said switch supplied from the battery and a magnet measuring the dynamo-pressure and controlling the said motor.

17. In an electric-lighting system, the combination with a variable-speed dynamo of a switch for connecting it to the line, a regulator for the dynamo and a magnet controlling both the said switch and the said regulator and provided with both a shunt and a series coil.

18. In an electric-lighting system, the combination with a variable-speed dynamo, of a switch for connecting it to the line, a regulator for the dynamo, electric lamps and a storage battery in multiple, and a magnet controlling both the said switch and the said regulator and provided with two coils, one a shunt-coil and the other a coil in series with the battery.

19. In an electric-lighting system, the combination with a variable-speed dynamo, of a switch for connecting it to the line, a regulator for the dynamo, lamps and a storage battery in multiple, and a magnet controlling both the said switch and the said regulator and provided with two coils, one a shunt-coil and the other a coil in the branch circuit leading to the battery.

Signed at Albany, New York, this 24th day of October, 1901.

JAMES F. McELROY.

Witnesses:
CHAS. L. WICK,
E. D. JANSEN.